July 11, 1939.  R. E. STOLZ  2,165,518
CONTROL DEVICE FOR REFRIGERATING SYSTEMS
Original Filed May 4, 1935  3 Sheets-Sheet 1

INVENTOR.
Rufus E. Stolz.
BY Hoodling and Krost
ATTORNEY.

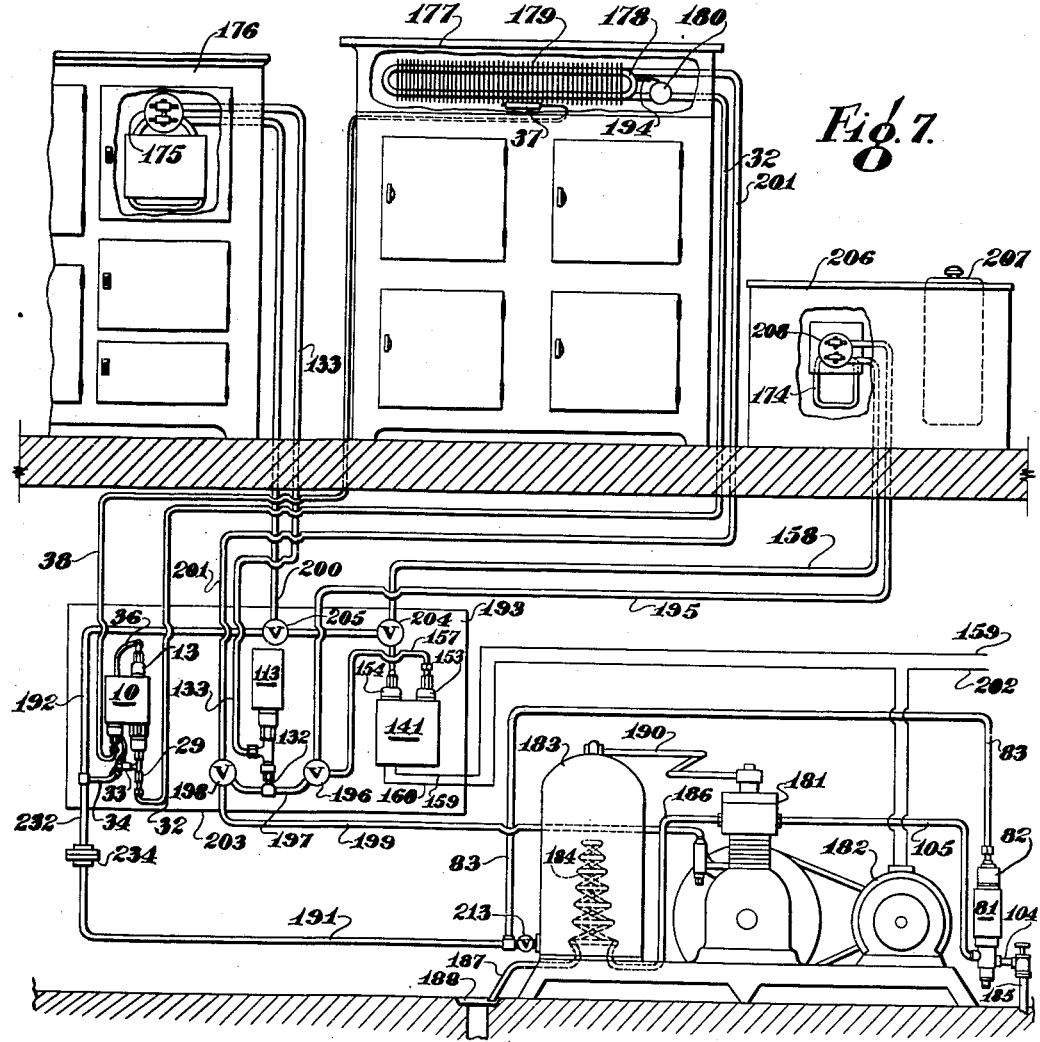
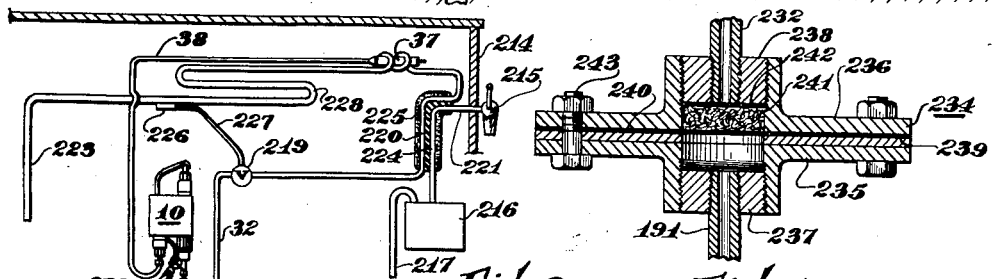
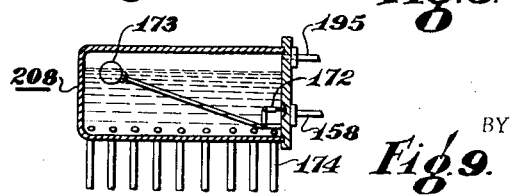

Patented July 11, 1939

2,165,518

UNITED STATES PATENT OFFICE 2,165,518

CONTROL DEVICE FOR REFRIGERATING SYSTEMS

Rufus E. Stolz, East Cleveland, Ohio

Original application May 4, 1935, Serial No. 19,819. Divided and this application January 4, 1939, Serial No. 249,322

25 Claims. (Cl. 62—3)

This application is a division of the application Serial No. 19,819 filed by me on May 4, 1935, for Control devices.

My invention relates to refrigeration systems, and more particularly to controlling the flow of refrigerants by means of valves and other control devices.

One object of my invention is the provision of a thermally actuated valve mechanism for controlling the flow of a refrigerant through an evaporator in accordance with the temperature conditions.

Another object of my invention is the provision of cooling a fluid discharge pipe or conduit and of controlling the degree of cooling by a thermally actuated valve mechanism.

Another object of my invention is to limit the growth of frost on a refrigerator evaporator by the action of a temperature responsive device controlling the flow of the refrigerant.

Another object of my invention is to control the temperature of a refrigerator evaporator by a temperature responsive device which is influenced by the temperature of the said evaporator.

Still another object of my invention is to control the temperature and frosting of an evaporator by a temperature responsive device which actuates a valve which allows or prohibits the flow of refrigerant through the evaporator.

Still another object of my invention is to provide a refrigerating system which will not only cool the liquid in a liquid container, but cool the liquid in the discharge pipe or conduit between the container and the discharge valve.

A still further object of my invention is to provide a closed refrigerant circuit through an evaporator and to regulate the flow of the refrigerant through that circuit by the use of several temperature responsive devices and valves, one temperature responsive device and valve to limit the frosting of the exit side of the evaporator, and another temperature responsive device and valve to admit the refrigerant to the evaporator in an operating cycle thereby accurately controlling the temperature of the evaporator.

A further object of my invention is to provide for controlling the flow of a refrigerant through an evaporator by the resultant pressure of several pressure means actuated by pressure from different points on the evaporator.

A further object of my invention is to provide for controlling the temperature of a closed refrigerant circuit having an evaporator by the action on a valve of the pressure resultant of several opposing pressures from different points in the refrigerant circuit.

Another object of my invention is to provide for sealing a valve in a valve casing by means of a flexible wall and for actuating the valve by means externally of the valve casing through means of the flexible wall, thereby effecting substantially a hermetically sealed valve.

Another object of my invention is the provision of a valve and a valve casing for controlling the flow of a medium, and a flexible means adapted to guide the valve and to entrap the medium from escaping from the valve casing past the valve in which case the medium exerts an internal pressure upon the flexible means and thereby urges the movement of the valve, taken in combination with equalizing means adapted to off-set the internal pressure of the medium upon the flexible means and thereby make the movement of the valve independent of the internal pressure of the medium acting upon the flexible means.

A still further object of my invention is the provision of actuating a valve for controlling the flow of a medium, wherein the medium influences the actuating means for the valve, taken in combination with an equalizing means adapted to off-set the influence of the medium acting upon the actuating means of the valve.

Another object of my invention is to prevent too much ice collecting upon an evaporator of a refrigerating system by controlling the flow of the refrigerant to the evaporator in accordance with temperature conditions.

A still further object of my invention is the provision of a pressure actuated snap valve mechanism for controlling the flow of a refrigerant to an evaporator, in accordance with the pressure conditions of the refrigerant.

Another object of my invention is the provision of a pressure actuating device for controlling a switch for interrupting the flow of current, taken in combination with an emergency pressure operating means for opening the switch when the pressure exceeds a predetermined selected value.

Another object of my invention is the provision of a pressure actuated snap valve mechanism for controlling the flow of cooling water, wherein the water either is flowing substantially full force or is substantially shut off, by reason of the snap action of the valve.

Other objects and a fuller understanding of my invention may be had by referring to the following description and claims, taken in combination with the following description, in which:

Figure 7 is a diagrammatic illustration of a refrigerating system, employing features of my invention;

Figure 8 is a fragmentry diagrammatic illustration of another use of my invention, and illustrates primarily the means for cooling the exit pipe through which a fluid is passed before discharged from the pipe;

Figure 9 is a cross-sectional view of an evaporator which may be employed in my refrigerating system shown in Figure 7, and Figure 10 is a cross-sectional view of a cleaning device which may be mounted in the fluid line of my refrigerating system, shown in Figure 7.

Figure 1:
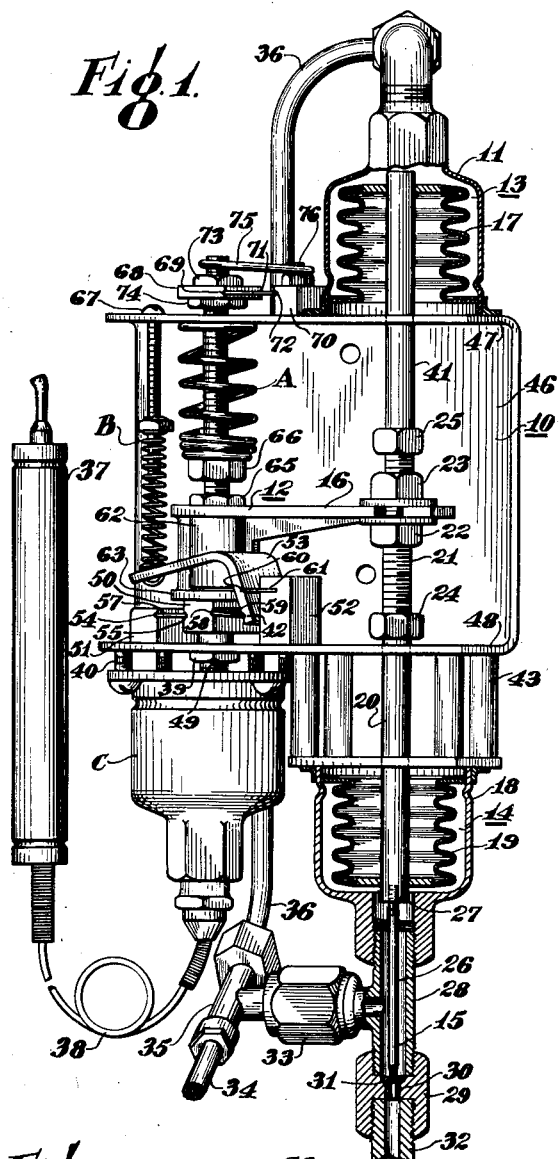
Figure 1 is a front view of a thermally actuated snap valve mechanism, embodying the features of my invention, parts being cut away to illustrate more clearly the construction of the working parts.

With reference to Figure 1 of the drawing, the reference character 10 indicates, generally, my thermally actuated snap valve mechanism, and comprises briefly a valve assembly having a control valve 15 and a valve casing 18, a lower flexible wall assembly indicated generally by the reference character 14, an upper neutralizing flexible wall assembly indicated generally by the reference character 13, a thermo-expansible fluid power device C, and a floating toggle arrangement indicated generally by the reference character 12, cooperating with the thermo-expansible power device C and having a large adjustment spring A and a small adjustment spring B, a common interconnecting member 16 which interconnects the floating toggle arrangement with the valve assembly for actuating the valve stem 26 of the control valve 15, and a body bracket 46 upon which the various parts are mounted.

The control valve 15, as will appear later in the description, is adapted to control the flow of the refrigerant to an evaporator of a refrigerating system. The refrigerant, as it comes from the compressor flows through the feed pipe 34 to a T-shaped nipple 35, thence through a thimble 33 into a second T-shaped nipple 28, then past the valve 15 to the exit pipe 32 which leads to the evaporator of the refrigerating system. As illustrated, the valve 15 is adapted to cooperate with a replaceable valve seat 31 which rests on top of a restriction 30 provided in the thimble 29. In actual practice, the replaceable valve seat 31 is constructed of stainless steel, in order to avoid corrosion which would, if allowed to occur, impair the operation of the control valve 15. The control valve 15 is provided with a valve stem 26 which is connected to the plunger 20 of the bellows 19 by means of a threaded end 27. Therefore, the bellows 19 constitutes a support for guiding the valve 15 with reference to the valve seat 31. This means that the valve stem 26 is entirely free to move up and down to control the flow of the refrigerant to the evaporator of the refrigerating system, except for the small amount of power required to move the bellows 17 and 19. Surrounding the bellows 19, is a valve casing 18 having a female threaded opening which threadably engages the upper threaded end of the T-shaped nipple 28. The upper end of the bellows casing 18 may be connected to the under side of the lower flange 48 of the body bracket 46 by means of the four interconnecting members 43. This construction provides for sealing the valve 15 in a valve casing by means of a flexible wall and for actuating the valve 15 by means externally of the valve casing, thereby effecting substantially a hermetically sealed valve. This is very important, for the reason that if the valve stem 26 had to extend through the usual valve packing for external operation, the said packing would have to be so tight to prevent leaking of the refrigerant past the valve stem that the up and down movement of the valve stem would be very stiff, making it impossible to operate it by the thermo-expansible fluid power device C. With this construction, however, the refrigerant exerts an internal pressure against the bellows 19, and thus tends to urge the valve stem 26 upwardly to open the valve 15. To off-set the effect of the internal pressure of the refrigerant acting upon the flexible wall bellows 19, I utilize an upper neutralizing flexible wall assembly 13, having a flexible wall bellows 17, which is of a construction similar to the construction of the flexible wall bellows 19. As illustrated, the flexible wall bellows 17, is enclosed in a casing 11 which is connected in communication with the T-shaped nipple 35 by means of an interconnecting pipe 36. The plunger 41 of the upper flexible wall bellows 17 projects downwardly through the upper flange 47 of the body bracket 46, and engages an adjusting nut 25 which threadably engages the upper end of the threaded floating stud 21. Upon the lower end of the threaded floating stud 21 is an adjusting nut 24 which contacts the upper end of the plunger 20 that is actuated by the flexible wall bellows 19. Intermediate the floating threaded stud 21 are two jam nuts 22 and 23 which engage the common interconnecting member 16 which interconnects the toggle arrangement indicated generally by the reference character 12 to the floating stud 21. By the foregoing arrangement, it is noted that the downward force produced by the upper neutralizing flexible wall bellows 17 is equal to the upward force produced by the flexible wall bellows 19. This means that the movement of the valve 15 is independent of the pressure of the refrigerant, and thus the operation of the valve 15 is controlled entirely by the force produced by the toggle arrangement indicated generally by the reference character 12.

While I have illustrated the neutralizing flexible wall bellows 17 as being mounted above and in vertical alignment with the flexible wall bellows 19, yet it is to be understood that the neutralizing flexible wall bellows 17 may be mounted in any opposing cooperative relationship with the flexible wall bellows 19. Thus, the neutralizing flexible wall bellows 17 may be mounted off to one side of the flexible wall bellows 19 and arranged to set up an opposing force through means of a lever system, such as, for example, through means of a walking beam type of construction of levers.

As illustrated, the thermo-expansible fluid power device C is connected in communication with a thermo-expansible fluid tube 37 by means of a tube 38. In actual practice, the thermo-expansible fluid tube 37 is provided with an expansible fluid, and accordingly the pressure exerted by the expansible fluid is a function of the temperature surrounding the expansible fluid tube. As will appear later in the description, this expansible fluid tube may be placed adjacent or in the vicinity of an evaporator of a refrigerating system, so that the pressure exerted by the expansible fluid is a function of the temperature condition of the evaporator and the surrounding circulating air. While not shown in cross-section, the thermo-expansible power device C may be constructed of a bellows similar to the flexible wall bellows 17 and 19. Therefore, the variable force exerted by the thermo-expansible fluid power device C is a function of the temperature conditions surrounding the thermo-expansible fluid tube 37.

The thermo-expansible fluid power device C is attached to the lower flange 48 by the screws 40 and is arranged to exert a variable force upon the floating toggle arrangement indicated generally by the reference character 12, and is disposed to work in opposition to the large adjustment spring A. See Figures 1, 3 and 4. The construction of the parts which interconnect the thermo-expansible fluid power device C with the large adjustable spring A may be explained as follows: Immediately above the thermo-expansible fluid power device C and partially projecting through the lower flange 48 of the body bracket 46, is a stop nut 39 which threadably engages a plunger 49 that is operated by the thermo-expansible fluid power device C. This plunger 49 extends throughout the length of the toggle assembly 12 and terminates at a point above the upper flange 47. Immediately above the threaded stop nut 39 and surrounding the plunger 49 is a rectangular block 50, against the upper edge of which, and surrounding the plunger 49, is placed the lower flange 63 of the interconnecting member 16. A tubular sleeve 62 surrounding the plunger 49, is arranged between the lower flange 63 and the upper flange of the interconnecting member 16. Immediately above the upper flange of the interconnecting member 16 is a jam nut 65. Therefore, when the jam nut 65 and the stop nut 39 are tightly turned down, the entire assembly of the parts associated with the plunger 49 becomes securely and rigidly connected to the plunger 49. The sleeve 63 is primarily utilized in order to afford a good strong support for the interconnecting member 16, so that there is no tendency for the interconnecting member 16 to become loose and have play with reference to the plunger 49. As illustrated, the large spring A is interposed between the upper flange 47 and an adjusting nut 66, so that the force of the large spring A may be varied by turning the adjusting nut 66. Above the flange 47 and threadably engaging the plunger 49 is a jam nut 74 and a jam nut 73 between which is mounted an upper floating block 68 having a longitudinal groove 69 provided on the right-hand longitudinal side thereof. Above the flange 47 there is also provided a stationary block 70 having a groove 72. Positioned in the two grooves 69 and 72 is a knife edged member 71 which pivots up and down as the plunger 49 is moved. In order to hold the knife edged member 71 within its associated grooves, I utilize a curved wire spring 75 having its left-hand end engaging the upper end of the plunger 49 and having its right-hand end engaging a stationary anchoring stud 76 mounted on top of the stationary block 70. Consequently, the combined action of the knife edged member 71 and the spring 75 is such as to guide the upper end of the plunger 49 while at the same time affording an up and down movement to the plunger that is substantially free of friction. The upward travel of the plunger 49 may be determined by the head of the stop nut 39 engaging the under surface of the lower flange 48 and the downward travel may be determined by the rectangular block 50 engaging the upper side of the flange 48.

With reference to the floating block 50, there is provided along its left-hand longitudinal face a groove 55 and along its right-hand longitudinal face a groove 58. Spaced to the left of the floating block 50 is a stationary block 51 which has along its right-hand longitudinal face a groove 54, and spaced to the right of the floating block 50 is a stationary block 52 having a knife-edge member 61 projecting from the left-hand longitudinal face thereof. Positioned in the longitudinal groove 54 of the stationary block 51 and the longitudinal groove 55 in the left-hand longitudinal face of the floating block 50 is a knife edged member 57. As illustrated, there is an inverted L-shaped lever 53 having along its inside lower longitudinal edge thereof, a groove 42. Interposed between the longitudinal groove 42 and the groove 58 of the floating block 50 is a knife-edge member 59. The right-hand outer edge of the inverted L-shaped lever 53 is provided with a longitudinal groove 60 in which is positioned the left-hand edge of the knife-edged member 61. The left-hand end of the inverted L-shaped lever 53 is urged upwardly by means of a small adjusting spring B which has its upper end thereof provided with a threaded nut adapted to receive the threads of the adjusting screw 67, which varies the tension of the adjusting spring B as it is turned. It is noted that the arrangement of the inverted L-shaped lever 53, together with its associated parts, provides a toggle arrangement having a knee-action to give a quick acting movement to the plunger 49. It is also noted that the toggle arrangement afforded by the inverted L-shaped lever 53 and its associated parts, taken in combination with the toggle arrangement positioned at the upper end of the plunger 49, is such as to provide a guide arrangement for the plunger 49 which is substantially free of friction. Therefore, my entire toggle assembly may be referred to as a floating guide arrangement. The absence of friction in the floating toggle arrangement more than offsets the small amount of power required to move the flexible wall bellows 17 and 19. In other words, the floating toggle arrangement has been made to move very freely to compensate for the power required to move the flexible wall bellows 17 and 19. The construction of my entire toggle arrangement is shown diagrammatically in Figures 3 and 4.

Figure 3:
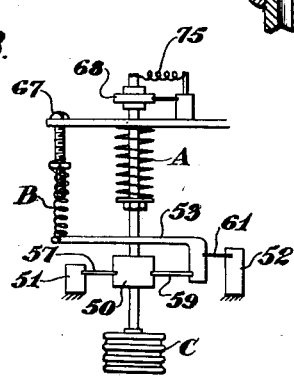
Figure 3 is a diagrammatic illustration of the floating toggle arrangement, embodying the features of my invention.

In the study of this diagrammatic showing, it is noted that when the knee-action produced by the knife-edged members 57 and 59 is substantially straight, there is substantially no urging force produced by the small spring B to move the plunger 49. This position is illustrated in Figure 3. On the contrary, it is noted with reference to Figure 4 that when the knee-action produced by the knife-edge members 57 and 59 is biased, there is an urging force produced by the small adjusting spring B to urge the plunger 49 upwardly. Therefore, when the knee-action produced by the knife-edge members 57 and 59 is substantially straight, it is only necessary when moving the plunger 49 upwardly for the variable force produced by the thermo-expansible fluid power device C to be increased to a value that is slightly greater than the opposing force produced by the large adjusting spring A. This means that when the temperature surrounding the thermo-expansible fluid tube 37 obtains a certain value sufficiently to cause the variable force created by the thermo-expansible fluid power device C, to be slightly greater than the opposing force set up by the large adjusting spring A, then the plunger 49 is urged upwardly which trips the toggle arrangement and opens the controlling valve 15. This allows the refrigerant to flow to the evaporator, which in turn reduces the temperature surrounding the expansible fluid tube 37. By this arrangement, the upper temperature setting at which the refrigerant is delivered to the evaporator, to produce a cooling action, is determined by the tension of the large adjusting spring A effected by the turning of the adjusting nut 66.

Figure 4:
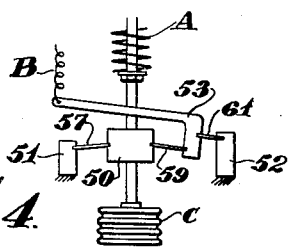
Figure 4 is a fragmentary view of the toggle arrangement shown in Figure 3, and illustrates a different position of the parts than that position illustrated in Figure 3.

With reference to Figure 4, it is noted that when once the plunger 49 is biased upwardly, then the force produced by the small adjusting spring B comes into play, and helps to urge or snap the plunger 49 upwardly. In other words, when the knee-action produced by the knife-edged members 57 and 59 are biased, the force produced by the small spring B opposes the downward force produced by the large adjusting spring A. Therefore, in order to close the control valve 15 to shut off the refrigerant to the evaporator, it is necessary that the temperature influencing the thermo-expansible fluid tube 37 be reduced to such low value that the variable force produced by the thermo-expansible fluid power device C plus the small adjusting spring B, be less than the force produced by the large adjusting spring A. Accordingly, the lower temperature at which the valve 15 is closed to stop the cooling action of the evaporator is much lower than the temperature at which the controlling valve 15 is opened to allow refrigerant to flow to the evaporator for producing a cooling action. This means that the spread between the upper temperture at which the control valve 15 is opened and the lower temperature at which the control valve is closed, is determined by the tension of the small adjusting spring B. Thus, by the construction of my thermally actuated snap valve mechanism 10, it is possible to set the lower temperature at which the refrigerant is delivered to the evaporator and the upper temperature at which the refrigerant is shut off from the evaporator.

Figure 2:
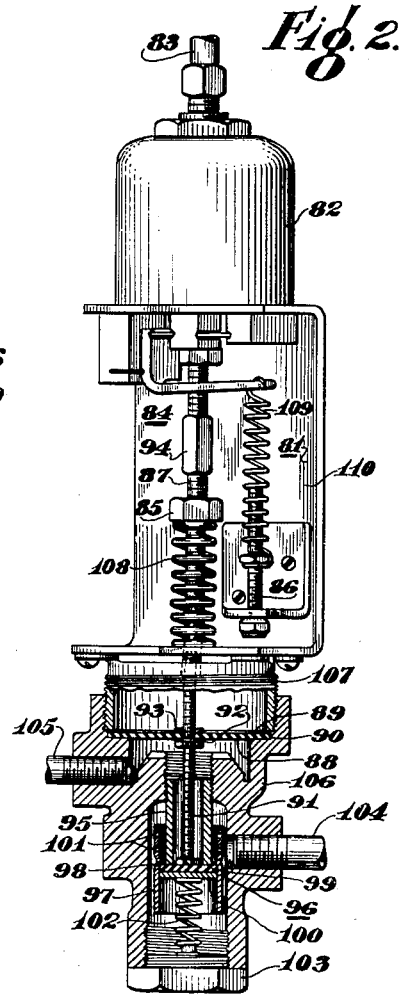
Figure 2 is a front view of a pressure actuated snap water valve mechanism, embodying the features of my invention, parts being cut in section to illustrate more clearly the construction of the working parts.

In Figure 2, I show the manner in which my quick-acting floating toggle arrangement may be employed to operate a fluid or water valve, the entire assembly being indicated generally by the reference character 81. This form of my invention may be referred to as a pressure actuating snap water valve, and comprises briefly a metallic bellows enclosed in the housing 82, a quick acting floating toggle arrangement indicated by the reference character 84, and a valve assembly indicated generally by the reference character 96 mounted beneath the lower flange of the body bracket 110.

The bellows enclosed in the housing 82 may be of a construction similar to that shown in cross-section in Figure 1, and is adapted to be connected in communication, as will appear later, with the high pressure refrigerant fluid line of a refrigerating system, by means of the connecting pipe 83. Therefore, when the pressure in the refrigerant fluid line exceeds a certain predetermined limit, the valve is open to allow water to flow through the valve assembly 96 and cool off the compressor and the condenser for liquefying the refrigerant.

The valve assembly 96 is arranged to be mounted below the lower flange of the body bracket 110, and comprises in general a valve casing 106, a stationary valve sleeve 95, a movable valve sleeve 97, a valve stem 91, a rubber valve washer 99, and a spring 102 for urging the rubber valve washer 99 against the lower end of the stationary valve sleeve 95. The upper end of the valve casing 106 is enlarged and provided with female threads adapted to screw upon the male threads provided on the annular flange 107 that is connected to the lower flange of the body bracket 110. As illustrated, the valve casing 106 is provided with an internal shoulder 90 upon which is mounted a flexible rubber diaphragm disk 88. Placed on top of the circumferential edge of the diaphragm disk 88 is an annular washer 89, so that when the valve casing 106 is firmly screwed upon the annular flange 107, the rubber diaphragm disk 88 is tightly held between the shoulder of the valve casing 88 and the annular washer 89.

The valve stem 91 that is threadably connected to and actuated by the plunger 97 of the floating toggle arrangement 84 is adapted to extend through the central portion of the rubber diaphragm disk 88 and threadably engage the lower end of the plunger 87 of the toggle arrangement 84. In order to provide a good seal therefor, a jam nut 93, is placed around the valve stem 91 and above the rubber diaphragm disk 88, and there is placed around the valve stem 91 and below the rubber diaphragm disk 88, a jam nut 92, so that when the two jam nuts 93 and 92 are tightly turned against the rubber diaphragm disks 88, there is provided a good tight seal. This prevents any fluid or water from escaping past the valve stem 91.

As shown, the upper inner surface of the valve casing 106 is provided with female threads which are adapted to threadably receive the upper end of the stationary valve sleeve 95. When the stationary valve sleeve 95 is screwed into the valve casing 106, the lower end thereof is arranged to coincide with the lower enlarged end of the valve stem 91 when the toggle arrangement is actuated to its uppermost position. Surrounding the stationary valve sleeve 95 is a movable valve sleeve 97 which is provided intermediate its ends with a circumferential shoulder 98 against which rests a rubber valve washer 99. Upon the underneath side of the rubber valve washer 99 is a metal washer 100 which urges the rubber washer 99 tightly against the lower end of the stationary valve sleeve 95 by means of the spring 102 that is interposed between the metal washer 100 and the removable plug 103 which is screwed into the lower end of the valve casing 106. In the upper peripheral surface of the movable valve sleeve 97, there is provided a plurality of openings 101, so that when the valve stem 91 is actuated downwardly by the toggle arrangement 84, the water or fluid which enters the entrance pipe 104 may flow through the opening 101 and past the rubber valve washer 99 and the end of the stationary valve sleeve 95, and thence through the central opening of the stationary valve sleeve 95 and out through the exit pipe 105. It is noted that, when the fluid or water is flowing through the valve assembly 96, there is only a slight pressure exerted upon the rubber diaphragm disk 88. This is because there is substantially no back pressure exerted by the fluid or water when flowing. Therefore, the toggle arrangement 84 is substantially free from influence by the fluid or water exerting a pressure from the rubber diaphragm disk 88. The arrangement of the valve assembly 96 is such that it can be easily dismantled for cleaning purposes simply by removing the end plug 103 and then removing the various parts of the valve.

The floating toggle arrangement 84 for actuating the valve assembly 96 is substantially the same as that hereinbefore described with reference to Figures 1, 3 and 4, and comprises a large adjusting spring 108 which corresponds to the large spring indicated by the reference character A in Figure 1, and a small adjusting spring 109 which corresponds to the small spring indicated by the reference character B in Figure 1. The adjusting nut 85 is arranged to control the adjustment of the large spring 108 and the adjusting screw 86 is arranged to control the adjustment of the small spring 109. Accordingly, the upper pressure exerted upon the bellows in the casing 82 at which the valve assembly is open to allow the cooling water to flow therethrough and cool the compressor and condenser is determined primarily by the setting of the large spring 108 by the adjustment screw 85, and the lower pressure exerted upon the bellows enclosed in the casing 82 at which the valve assembly is closed to prevent the fluid or cooling water to flow therethrough is determined by the setting of the small spring 109 by the adjusting screw 86.

To facilitate the assembly of the toggle arrangement, the plunger 87 is connected to the plunger that is actuated by the bellows by means of the threaded sleeve nut 87. In addition to the rubber diaphragm washer 88 acting as a seal to prevent any fluid or water escaping past the valve stem 91, it is noted that it provides a lower guide to the movement of the floating toggle arrangement.

The function of the floating toggle arrangement 84 is such as to give a quick acting snap movement to the valve, in which case the valve is either fully opened or fully closed to control the flow of the cooling water to the compressor and the condensing unit.

Figures 5, 6:
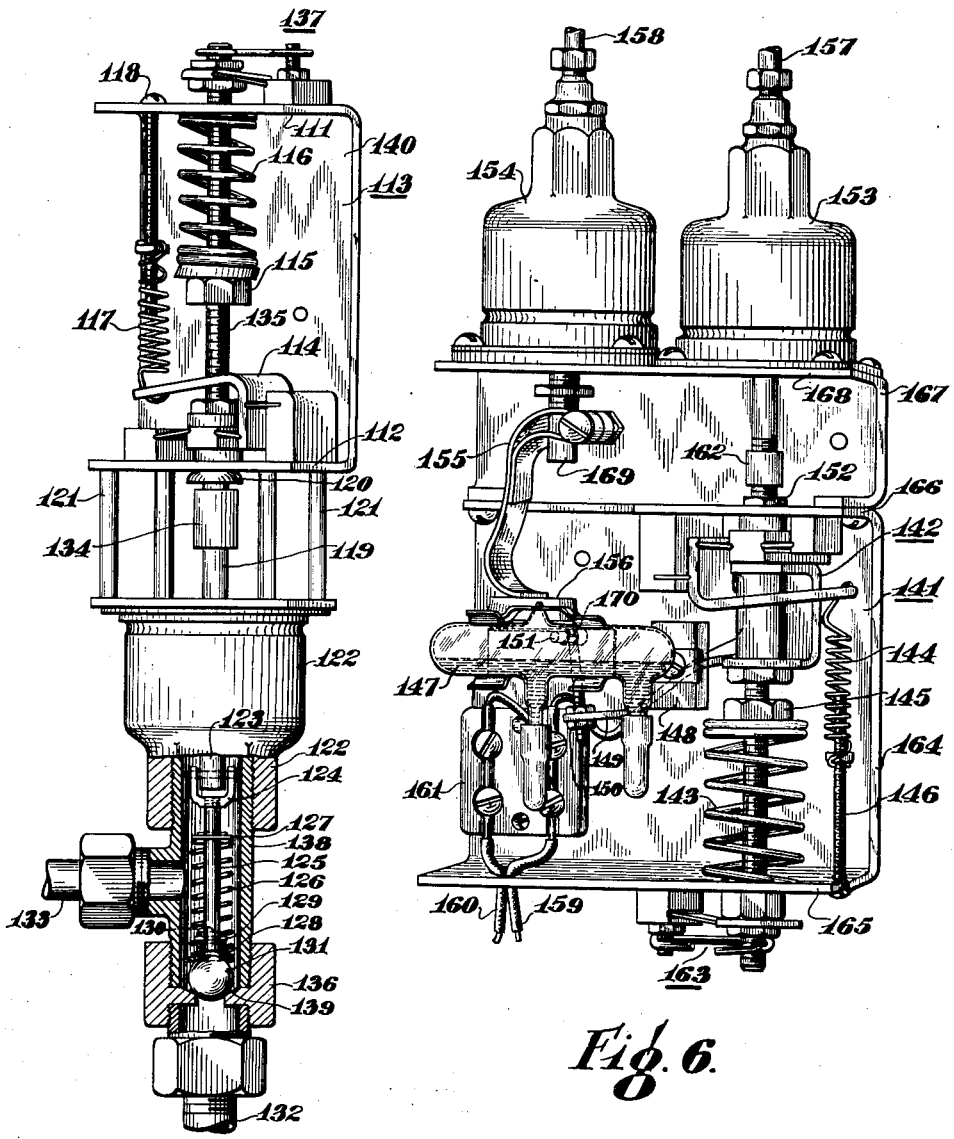
Figure 5 is a front view of a pressure actuated snap valve mechanism, embodying the features of my invention, parts being cut in section to illustrate more clearly the construction of the working parts.
Figure 6 is a front view of a quick acting pressure operated switch, embodying the features of my invention.

In Figure 5, I illustrate another form of a valve embodying the features of my invention, which is indicated generally by the reference character 113. This form of my invention may be referred to as a pressure actuated snap refrigerant valve, and comprises in general a body bracket 140, a floating toggle arrangement indicated generally by the reference character 115, a bellows enclosed within the casing 122, and a valve assembly actuated by the toggle arrangement and the bellows. As illustrated, the bellows may be connected to the lower flange 112 of the body bracket 140 by means of the inner-connecting members 121. The lower portion of the casing 122 is provided with female threads to receive the upper end of a T-shaped nipple 138. Screwed to the lower end of the T-shaped nipple 138 is a nipple 136 having a valve seat 139 on which rests the ball valve 131.

Soldered to the upper surface of the ball valve 131 is a short sleeve 128 that is urged against the ball valve by means of a spring 126 surrounding the valve plunger 125 and having its upper end engaging a stop 127 connected to the valve stem 125. In order that the ball valve 131 may freely find its seat 139, I utilize a yoke and pin connection 124 which connects the valve plunger 125 to the upper plunger 123 that is connected to the bellows enclosed within the casing 122. The sleeve 128 is loosely connected to the valve plunger 125 by means of a cross pin 129 that passes through an enlarged opening 130. This means that there is a small amount of play between the movement of the plunger 125 and the movement of the ball valve 131.

The floating toggle arrangement indicated generally by the reference character 114, is substantially the same as that described hereinbefore with reference to Figures 1, 3 and 4 and comprises a large adjusting spring 116 that corresponds to the large spring indicated by the reference character A in Figure 1 and a small adjusting spring 117 that corresponds to the small spring indicated by the reference character B in Figure 1. The upper single knife edged guiding arrangement that is mounted above the upper flange 111 of the body bracket 140, is indicated generally by the reference character 137 and is substantially the same as that shown in Figure 1. The adjusting nut 115 varies the tension of the large spring 116 and the screw 118 varies the tension of the small spring 117. To facilitate the assembly, the lower plunger 119 that is actuated by the bellows in the casing 122 is connected to the upper plunger 135 by means of the threaded sleeve 134. The reference character 120 indicates a stop nut for limiting the upper travel of the toggle arrangement and for securely holding the parts to the plunger 135.

In actual practice, this form of my invention may be utilized to control the flow of a refrigerant in a refrigerating system, and it is noted that the refrigerant itself in this form of my invention controls the bellows mounted in the casing 122, which, in turn, controls the flow of the refrigerant itself. In this connection, let it be assumed that the pressure of the refrigerant which enters the pipe 133 flows into the valve assembly and exerts an upper pressure upon the bellows within the casing 122. When this pressure obtains a certain predetermined upper value, it causes the toggle arrangement 114 to kick upwardly and allows the refrigerant to flow past the ball valve 131 and out into the exit pipe 132. It is noted that upon the initial upward movement of the toggle arrangement 114, the spring 126 still urges the ball valve 131 against its seat until the slack or play or the opening 130 in the upper plunger 125 contacts the cross pin 129 and raises the sleeve 128. This means that there is a delay to the opening of the ball valve 131, until after the floating toggle arrangement 114 is biased far enough by the bellows enclosed within the casing 122 to carry the toggle arrangement to the end of its travel. In other words, if the ball valve 131 were allowed to open immediately with a slight upward movement of the toggle arrangement, the refrigerant would flow past the ball valve 131, in which case the back pressure of the refrigerant would immediately be reduced to cause the ball valve 131 to close again. This would cause chattering of the ball valve 131, and in order to overcome this, I utilize the slack or play between the cross pin 128 and the enlarged opening 131.

In Figure 6, I show how my invention may be employed into a quick acting pressure operated switch, indicated generally by the reference character 141. This switch assembly comprises in general a body bracket 164, a mercury switch 147, a bellows enclosed within the casing 153 for operating the floating toggle arrangement indicated generally by the reference character 142, and an emergency bellows enclosed within the casing 154 for operating the mercury switch 147 in the event that the pressure of the fluid line 148 of a refrigerating system obtains a predetermined high value. The construction of the mercury switch 147 is of the usual form and is arranged to be pivotally mounted upon a pivot pin 151, and is actuated by the floating toggle arrangement 142 by means of an actuating arm 149 which carries an adjusting screw 150 having its upper end contacting a portion 170 for tilting the mercury switch 147 to its opened position in a counter clockwise direction when the movement of the toggle arrangement 142 is upwardly. In accordance with usual practice, a weight 148 is utilized to re-tilt the mercury switch 147 to its closed position in a clockwise direction when the toggle arrangement 142 is actuated to its downward position. The two lower mercury pools of the mercury switch 147 are connected respectfully to a terminal block 161 to which are connected the control wires 159 and 160 for controlling the starting and stopping of the electric motor for driving the refrigerating compressor.

The two bellows within the casing 153 and 154 are mounted on the upper flange 168 of a supplementary body bracket 167 that is connected to the upper flange 166 of the body bracket 164. To facilitate assembly, the plunger of the bellows within the casing 153 is connected through means of the interconnecting screw sleeve 162 to the floating toggle arrangement 142. The construction of the floating toggle arrangement 142 is substantially the same as that shown and described in Figures 1, 3 and 5 and comprises a large adjusting spring 143 and a small adjusting spring 144. The adjusting nut 145 is arranged to adjust the tension of the large spring 143 and the screw 146 is arranged to adjust tension of the small spring 144. Mounted beneath the lower flange 165 of the body bracket 164 is the single knife edged floating arrangement, indicated generally by the reference character 163.

In the operation of this switch, when the pressure of the refrigerant entering the pipe 157 exceeds a certain predetermined upper value, the bellows within the casing 153 actuates the toggle arrangement downwardly, and thus allows the weight 148 to rotate the mercury switch 147 in a clockwise direction to close the switch and start the refrigerating compressor. When the compressor is once started, the pressure will fall until it obtains a certain predetermined lower value, and then the toggle arrangement is actuated upwardly to open the switch 147 and stop the motor from driving the refrigerator compressor. As hereinbefore noted, the upper pressure at which the switch 147 is closed is determined by the setting of the large spring 143, and the lower limit at which the switch is opened is determined by the setting of the small spring 144. The reference character 152 indicates a stop nut for limiting the downward travel of the toggle arrangement 142 and for securely holding the parts to the plunger.

In this embodiment of the invention, there is provided an emergency bellows, within the casing 154 and the plunger 169 thereof is connected by means of an actuated arm 155 to engage the contacting surface 156 of the mercury switch assembly 147. Therefore, when the pressure of the refrigerant in the fluid line 158 of the refrigerating system reaches a certain predetermined high value, the bellows within the casing 154 expands downwardly, and causes the actuating arm 155 to press down on the contacting surface 156 and tilt the mercury switch in a counter clockwise direction to open the circuit for stopping the compressor motor.

In Figure 7, I have diagrammatically illustrated a refrigerating system employing the devices illustrated in Figures 1, 2, 5 and 6 and are respectively indicated generally by the reference characters 10, 81, 113 and 141.

The quick acting snap valve assembly 81, hereinbefore noted, may be utilized as a pressure actuated snap water valve and is adapted to control the flow of the cooling water to the refrigerating compressor 181 and a condenser 183. The bellows 82 of this pressure actuated snap water valve is connected to the high pressure refrigerant fluid line 191 of the refrigerating system through means of a pipe 83. Therefore, when the pressure in the refrigerant fluid line 191 attains a predetermined high value, the floating toggle arrangement of the pressure actuated snap water valve 81 trips and opens the valve to allow cooling water to flow from the supply pipe 185, through a pipe 104, thence through the valve assembly of the pressure actuated snap water valve 81, the pipe 105, the water jacket of the refrigerating compressor 181, and thence through a pipe 186 to the condenser pipes 184, and then out through the exit pipe 187 to the sewer 188. As the cooling water flows through the water jacket of the refrigerating compressor 181 and the condenser pipes 184, the pressure of the refrigerant in the fluid line 191 is gradually reduced, and when it reaches a predetermined low value, the floating toggle arrangement of the pressure actuated snap valve 81 trips and closes the valve to shut off the flow of the water through the water jacket 181 and the condenser pipes 184. Accordingly, the cooling water is either flowing full force or is shut off, by reason of the quick acting function of the floating toggle arrangement of the pressure actuated snap water valve 81.

The refrigerating system shown in Figure 7 illustrates three cooling devices that are adapted to be controlled in accordance with my invention. One of the cooling devices may be in the form of an ice cream cabinet, indicated generally by the reference character 206 having an ice cream container 207 mounted therein. In accordance with usual practice, the ice cream cabinet is supplied by brine and is arranged to be cooled by an evaporator, indicated generally by the reference character 208. The evaporator illustrated is of the "flooded" type, and is arranged to have a series of pipes 174 connected thereto and immersed in the brine. A cross-sectional view of the evaporator is illustrated in Figure 9. In practice, the refrigerant delivered to the evaporator 208 is controlled by means of a needle valve 172 actuated by a float 173. The refrigerant, as it is delivered to the evaporator 208, is in liquid form, but as it cools the brine, it vaporizes and thereby occupies the space in the evaporator above the liquid level. From here it is sucked out of the evaporator through the pipes 195. The pipe connections for delivering the refrigerant to and from the evaporator 208 may be traced as follows:

Beginning with the evaporator 208, the vaporized refrigerant is sucked through the pipe 195, a service valve 196, a pipe 197, a service valve 198, a pipe 199 to the crank case of the compressor unit 181; from thence the vapor refrigerant is compressed and forced back to the evaporator 208 through the pipe 190 to the condenser 183, where the vapor refrigerant is cooled and liquefied.

From the condenser 183 the fluid refrigerant is forced through a service valve 213, a pipe 191, a cleaning device 234, a pipe 232, a pipe 192, a service valve 204, a pipe 158, to the evaporator 208. So long as the compressor is driven by the electrical motor 182, the vapor refrigerant is sucked from the evaporator 208, compressed, liquefied and redelivered to the evaporator 208 in liquid form. In a "flooded" type of evaporator, the pressure of the vapor refrigerant is determined primarily by the temperature of the brine. Therefore, I utilize my pressure actuated switch 141 to control the starting and stopping the electric motor 182 which drives the compressor 181, in accordance with the pressure of the vapor refrigerant in the evaporator 208. In other words, inasmuch as the vapor pressure of the refrigerant is a function of the temperature of the brine, it follows that the compressor 181 is controlled in accordance with the temperature of the brine, or in accordance with the duty of refrigeration.

As illustrated, the bellows in the casing 153 of the pressure operated switch 141 is connected in communication with the service valve 196 through a pipe 157. The emergency bellows in the casing 154 of the pressure operated switch 141 is connected to the service valve 204, thereby connecting the emergency bellows in direct communication with the high pressure refrigerant fluid line. This means that when the pressure of the high pressure refrigerant fluid line exceeds a certain predetermined high value, the emergency bellows contained in the casing 154 expands and in turn operates the mercury switch 147 to shut off the electric motor 182. The circuit for controlling the electric motor 182 may be treated as follows: Beginning with the supply conductor 159, the current flows through the mercury switch 147 and thence back through a conductor 160 to the motor 182 and out to the supply line 202.

The upper temperature of the brine at which the motor 182 is started, and the lower temperature of the brine at which the motor 182 is stopped, is determined by the setting of the toggle arrangement of the pressure actuated switch 141. In other words, the large spring 143 determines the upper vapor refrigerant pressure at which the toggle arrangement 142 snaps downwardly to close the switch and start the motor, and the small spring 144 determines the lower pressure at which the toggle arrangement snaps upwardly to open the switch and stop the motor. This means that the spread between the upper temperature and the lower temperature of the brine is determined by the setting of the small spring 144, but the value of the upper temperature setting is determined by the adjustment of the large spring 143. For very low temperature, such as that encountered in an ice cream container, the vapor pressure of the refrigerant in the evaporator of the "flooded" type usually is negative; that is to say, the motor is shut off, for example, at 16 inches of vacuum, and the motor is started at zero inches of vacuum. These values, of course, depend on the nature of the refrigerant used. Therefore, it is to be understood that when the term pressure is used, it covers both positive and negative pressures.

In Figure 7, I also illustrate a second "flooded" type of an evaporator, indicated generally by the reference character 175 for cooling a refrigerator compartment 176. For this type of service, the range of temperatures at which the motor is started and at which the motor is stopped is in a higher bracket, than the range of temperatures at which the motor is started and stopped for operating the ice cream cabinet 206. Thus, for example, the temperature at which the motor is started with the refrigerator compartment 176 may correspond to eight pounds of pressure, and the temperature at which the motor is stopped may correspond to eight inches of vacuum. In order to operate two or more "flooded" types of evaporators from the same compressor unit at different temperature brackets, I utilize the pressure actuated snap refrigerant valve 113. The flow of the refrigerant from and to the evaporator 175 may be traced as follows: Beginning with the evaporator 175, the vapor refrigerant is sucked through the pipe 133, the valve of the pressure actuated snap valve mechanism 113, the service valve 198, and the pipe 199 to the crank case of the compressor unit 181. From here the refrigerant is compressed and forced through the pipe 190 to the condenser 183, where the vapor refrigerant is liquefied and forced back to the evaporator 175 through the service valve 213, the pipe 191, a cleaner 234, the pipe 232, the pipe 192, the service valve 205, and the pipe 200 to the evaporator 175. This cycle of operation is continued so long as the pressure actuated snap valve mechanism 113 is open; provided, of course, that the compressor 181 is being operated. Let us assume that the compressor 181 is running, as it will be if the temperature of the brine in the ice cream cabinet 206 is above its lower limit. Under the running condition of the compressor 181, the upper temperature bracket of the evaporator 175 is determined by the setting of the large spring 116 and the lower temperature bracket is determined by the setting of the small spring 117 of the pressure actuated valve mechanism 113 see Figure 5. Thus, the pressure actuated snap valve mechanism 113 may be set to open the valve at eight pounds pressure and allow the refrigerant to flow from the evaporator 175, and set to close the valve when the vapor pressure of the refrigerant decreases to eight inches of vacuum. In other words, the toggle arrangement of the pressure actuated valve mechanism 113, is set for a higher temperature bracket than the temperature bracket at which the toggle arrangement for the pressure actuating switch 141 is set. Therefore, by the utilization of my pressure actuated snap valve assembly 113, I am able to operate two or more "flooded" types of evaporators at different temperature brackets from the same compressor unit. The setting of the toggle arrangement for the pressure actuated snap valve 113 may be such as to prevent too much ice collecting on the evaporator. In other words, the evaporator 175 is de-frosted each time that the valve is closed.

In accordance with the current practice, the "flooded" type of evaporator is being replaced by what is known in the trade as a "dry" evaporator. Hence, if the customer desires to have additional refrigeration service from the same compressor, the present policy is to install a "dry expansion" evaporator instead of the former "flooded" type of evaporator. This means that the "dry expansion" evaporator is operated from the same compressor that feeds the "flooded" type of evaporator. In Figure 7, I illustrate an installation of the "dry expansion" type of evaporator in the refrigerator box 177. In this illustration, a reference character 178 designates a coil of pipes having fins 179 controlled by the thermo-expansion valve 180. In accordance with the practice of dry expansion evaporators, there is installed a small thermo-expansion fluid tube 194 adjacent the exit pipe of the dry expansion evaporator, so that whatever ice is formed on the pipe 178, cannot run back beyond the thermo-expansible fluid tube 194, because just as soon as the ice reaches the thermo-expansible fluid tube 194, the expansible fluid therein contracts and operates to shut off the expansion valve 180.

In the operation of a "dry expansion" evaporator, the pressure of the refrigerant is not a measure of the temperature, as is the case of a "flooded" type. The pressure of the vapor refrigerant, when the thermo-expansion valve 180 is "breathing", is substantially constant, regardless of the temperature conditions. Therefore, it is impossible to operate a "dry expansion" evaporator by means of the pressure of the vapor refrigerant, as is the case with the "flooded" type of evaporator. Accordingly, I utilize my thermally actuated snap valve mechanism, indicated generally by the reference character 10 to control the "dry expansion" evaporator 178. The circulation of the refrigerant for the "dry expansion" evaporator 178 may be as follows: Beginning with the evaporator 178 the refrigerant is sucked to the compressor 181 through the pipe 201, the service valve 198, the pipe 199 to the crank case of the compressor 181. Here the vapor refrigerant is compressed and forced through the pipe 190 to the evaporator 178 through the service valve 213, the pipe 191, the cleaning device 234, the pipe 232, the pipe 34 to and through the valve of the thermo actuated snap valve mechanism 10, and the pipe 32 to the expansion valve 180 which feeds the coils 178 of the "dry expansion" evaporator. This cycle of operation is continued so long as the thermally actuated snap valve mechanism 10 is opened; provided the compressor unit 181 is driven by the motor 182.

As illustrated, there is positioned adjacent the fins 179 of the "dry expansion" evaporator, the thermo-expansible tube 37, which is connected in communication with the thermally actuated snap valve mechanism 10 by means of the pipe 38. This means that the thermally actuated snap valve mechanism 10 is controlled by the variable fluid pressure within the thermo-expansible tube 37. While the thermo-expansible tube 37 is mounted adjacent the fins 179, yet it is influenced by the temperature of the circulating air within the refrigerator 177, as well as by the skin temperature of the fins 179. In the operation of a "dry expansion" evaporator, there is a tendency for the ice or frost to collect upon the fins, and if the frost or the ice were allowed to continue to collect, there would be formed a complete closure of ice around the fins 179. When this condition happens, the effective area of the cooling surface of the "dry expansion" evaporator is materially reduced, because the circulating air can no longer contact the available space between the fins 179. Accordingly, it is necessary to control the flow of the refrigerant to the "dry expansion" evaporator, such that the refrigerant is shut off when too much ice begins to collect on the fins 179. The refrigerant is kept shut off until the ice has substantially melted from the fins 179. Therefore, the thermally actuated snap valve mechanism 10 is usually set to open the valve when the skin temperature of the fins 179 is at approximately 33 degrees, just above the melting point of ice. For commercial purposes in order to give the proper refrigeration to the cooling of a refrigerator box, the lower temperature at which the valve is set to close may be approximately 16 degrees, skin temperature. With reference to the thermally actuated snap valve mechanism 10, the setting to give the upper 33 degrees skin temperature is determined by the tension of the large spring A and the setting to give the lower 16 degrees skin temperature is determined by the setting of the small spring B. It is also noted that, just as soon as the ice begins to cover the thermo-expansible fluid tube 37, the circulating air of the refrigerator box 177, which is of a higher temperature than the skin temperature of the fins 179, is isolated from the thermo-expansible tube 37 itself, and thus under this condition, the thermally actuated snap valve mechanism 10 operates to close the valve and stop the flow of the refrigerant at a slightly higher value than 16 degrees skin temperature. This means that just as soon as too much ice begins to form upon the fins 179, the tendency for the valve mechanism 10 to close earlier, is on the safe side. It is to be understood, however, that the range of temperatures which I have assumed throughout this discussion is merely arbitrary, and may vary for different servicing conditions, as well as with the kind of refrigerant utilized. In the actual practice, the temperature bracket settings effected by the thermally actuated snap valve mechanism 10 to control the "dry expansion" evaporator for the refrigerator box 177, may be substantially the same as the temperature bracket settings effected by the pressure actuated refrigerant valve 113 which controls the "flooded" type of evaporator 175 for the refrigerator box 176. From the foregoing, it is noted that with the employment of my several control devices, it is possible to control either the "flooded" type or the "dry expansion" type of an evaporator, and operate them at different temperature brackets for one compressor unit. For convenience, the thermally actuated snap valve mechanism 10, the pressure actuated snap valve 113, and the pressure actuated switch 141, may be mounted upon a panel 193.

In Figure 8, I show another use for my thermally actuated snap valve 10, in that it may be employed to control the cooling of the exit or "goose neck" pipe 221 installed under a counter 214 and controlled by a hand valve 215. As illustrated, the fluid or drink is fed by a pipe 217 into the container 216, where the container is usually refrigerated. If the fluid or drink is allowed to stand for any considerable length of time in the "goose neck" pipe 221, the drink becomes warm. Therefore, when a drink is served by operating the valve 215, the first few customers receive a warm drink. This is very objectionable. To overcome this objection, I provide for cooling the "goose neck" pipe 221. To this end, I place a strip of rubber tape 224 between the "goose neck" pipe 221 and the fluid refrigerant cooling pipe 220 which contains the cooling refrigerant and which is controlled by the thermo-expansion valve 219. The cooling or refrigerant pipe 220 and the "goose neck" pipe 221, are wrapped with asbestos tape 225 to obtain efficient operation. The fluid refrigerant, as it is forced from the compressor and condenser flows through a pipe 222 and enters the thermally actuated snap valve mechanism 10, and thence flows through the expansion valve 219, the fluid refrigerant pipe 220, the extra length of pipe 228 and out through the pipe 223 to the crank case of the compressor unit. The thermo-expansible fluid tube 37 is mounted within several loops of the cooling or refrigerant pipe 220. Therefore, the amount of refrigerant delivered to the cooling pipe 220 to cool the "goose neck" pipe 221 is determined by the setting of the thermally actuated snap valve mechanism 10 which keeps the drink cooled to the desired temperature. In this manner, the first few customers who are served a drink, have a cool drink as well as the later served customers. In accordance with usual practice, a thermo-expansible fluid tube 226 is mounted adjacent the exit end of the extra length of pipes 228, in order to prevent the ice running back on the pipe 223, because when the ice strikes the thermo-expansible fluid tube 226, the expansion valve 219 is shut off. The operation and function of my thermo-actuated snap valve mechanism 10 in connection with this installation is the same as that herein described with reference to the "dry expansion" evaporator 178 of Figure 7.

In Figure 10, I show a cleaning device adapted to clean the refrigerant and thereby keep the system free from as much trouble as possible. In the operation of a refrigerating system, there is a tendency for the foreign matter to collect upon the needle valve controlled by the float of the "flooded" type of evaporator. This prevents the proper operation of the evaporator. To overcome this difficulty, I place my cleaning device in the fluid refrigerant line in advance of the evaporator.

With reference to Figure 10, the cleaning device is designated generally by the reference character 234, and comprises two flanges 235 and 236 between which are placed two screens 240 and 242, between which is placed a supply of ordinary absorbent cotton 241. A lead gasket 239 is placed between the two flanges in order to make a good tight seal, when the cap screws 243 are turned down. Screwed within the flange 235 is a lower plug 237 which receives the fluid pipe 191 and screwed in the upper flange 236 is an upper plug 238 which receives the pipe 232. The screens have very fine mesh to prevent the larger foreign matter from going therethrough. The action of ordinary absorbent cotton makes a very good filter so that whatever small matter passes through the fine mesh screens is collected by the cotton. When the cleaning device has been in operation for a certain length of time, it may be dismantled and cleaned. In dismantling the cleaning device, all of the service valves 213, 196, 198, 205 and 204 are closed, while the compressor sucks all of the refrigerant from the blanked pipes, after which the cleaning device may be dismantled, supplied with clean cotton, and re-installed in the system.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:
1. The combination with a container for holding a liquid, of a discharge fluid pipe extending from the container, a valve for controlling the discharge of the fluid from the fluid pipe, evaporator means including an expansion valve for cooling the fluid contained in the discharge fluid pipe, said expansion valve being of the "breathing" type and also of the type limiting the frosting of the exit side of the evaporator, a control valve in series with the expansion valve for controlling the delivery of the refrigerant to the expansion valve of the evaporator means, and thermally actuated means influenced by the evaporator means for controlling the control valve, said control valve including snap-action means for quickly operating said control valve.

2. A device for controlling the flow of refrigerant in an evaporator having an entrance and an exit side comprising, in combination, a valve connected in communication with the evaporator for controlling the flow of refrigerant, means for controlling the valve to admit of an operating cycle of the flow of the refrigerant in the evaporator in response to the variation of the temperature at a given portion intermediate the entrance and exit side of the evaporator, and means to regulate the upper temperature at which the operating cycle of the flow of the refrigerant in the evaporator is initiated and the lower temperature at which the operating cycle is arrested.

3. A device for controlling the flow of refrigerant in an evaporator having an entrance and an exit side comprising, in combination, a first valve connected in communication with the evaporator for controlling the flow of refrigerant, means for controlling the first valve to admit of an operating cycle of the flow of the refrigerant through the evaporator in response to the variation of the temperature at a given portion intermediate the entrance and the exit side of the evaporator, a second valve connected in communication with the evaporator for controlling the flow of refrigerant, means for governing the second valve in response to the variation of the temperature at a given portion of the exit side of the evaporator to limit the frosting of the exit side of the evaporator in the direction of the flow of the refrigerant.

4. The combination with an evaporator arranged for inclusion in a closed circuit for a refrigerant, of valve means connected in communication with the evaporator for controlling the flow of refrigerant, and means including two temperature responsive means governed by the variation of temperature at two spaced portions of the closed circuit for governing the valve means, one of said responsive means being arranged to limit the frosting of the exit side of the evaporator in the direction of the flow of the refrigerant and the other said responsive means being arranged to admit of an operating cycle of the flow of the refrigerant in the evaporator.

5. The combination with an evaporator arranged for inclusion in a closed circuit for a refrigerant, of first and second valve means connected in communication with the evaporator for controlling the flow of refrigerant, a first temperature responsive device governed by the variation of temperature of the evaporator for governing the first valve means, a second temperature responsive device governed by the variation of temperature of the evaporator for governing the second valve means, one of said responsive means being arranged to limit the frosting of the evaporator and the other said responsive means being arranged to admit of an operating cycle of the flow of the refrigerant in the evaporator.

6. The combination with an evaporator having an entrance and an exit side arranged for inclusion in a closed circuit for a refrigerant, of valve means connected in communication with the evaporator for controlling the flow of refrigerant, controlling means including a temperature responsive means governed by the variation of temperature at a given portion intermediate the entrance and the exit side of the evaporator for controlling the valve to admit of an operating cycle of the flow of the refrigerant in the evaporator, and means for causing the controlling means to operate and close the valve means and arrest the flow of the operating cycle of the refrigerant at a temperature substantially where the frost begins to collect on the said intermediate portion of the evaporator and to operate and open the valve means and permit the flow of the operating cycle of the refrigerant at a temperature substantially where the frost begins to melt on said intermediate portion of the evaporator.

7. The combination with an evaporator having an entrance and an exit side arranged for inclusion in a closed circuit for a refrigerant, of valve means connected in communication with the evaporator, first temperature responsive means governed by the variation of the temperature at a given portion of the exit side of the evaporator for operating said valve means and limiting the frosting of the exit side of the evaporator in the direction of the flow of the refrigerant, snap-action valve means connected in communication with the evaporator for controlling the flow of refrigerant, controlling means including a second temperature responsive means governed by the variation of the temperature at a given portion intermediate the entrance and the exit side of the evaporator for controlling the snap-action valve means to admit of an operating cycle of the flow of the refrigerant in the evaporator, and means for causing the controlling means to operate and quickly close the snap-action valve means and arrest the flow of the operating cycle of the refrigerant at a temperature substantially where the frost begins to collect on the said intermediate portion of the evaporator and to operate and quickly open the said snap-action valve means and permit the flow of the operating cycle of the refrigerant at a temperature substantially where the frost begins to melt on said intermediate portion of the evaporator.

8. The method of admitting a refrigerant to an evaporator which comprises regulating the admission of a refrigerant to the evaporator in accordance with the variation of pressure of the refrigerant entering the pressure side of the evaporator and with both the variation of the temperature at a given portion of the exit side of the evaporator to limit the frosting of the exit side of the evaporator in the direction of the flow of the refrigerant and the variation of the temperature at a given portion of the evaporator in advance of the first-mentioned given position to admit of an operating cycle of the flow of the refrigerant in the evaporator.

9. The method of controlling a valve and the flow of refrigerant in a closed circuit of a refrigerating system including an evaporator which comprises opening and closing the valve in accordance with a de-frosting cycle governed by the variation of the temperature at a given portion intermediate the exit and entrance sides of the evaporator.

10. In a refrigerating system having an evaporator, in combination, first valve means connected in communication with the evaporator for controlling the flow of the refrigerant, resilient means for urging the valve means in one direction to influence the operation of the valve means, flexible wall means for urging the valve means in the opposite direction, first thermostatic bulb means connected in communication with the flexible wall means and influenced by the variation of temperature at a portion intermediate the entrance and exit side of the evaporator for controlling the first valve means, second valve means connected in communication with the evaporator for controlling the flow of the refrigerant, and second thermostatic bulb means influenced by the variation of temperature at a given portion of the exit side of the evaporator for controlling said second valve means to limit the frosting of the evaporator.

11. In a refrigerating system having an evaporator arranged for inclusion in a closed refrigerant circuit, in combination, valve means including two valves connected in communication with the evaporator for controlling the flow of the refrigerant, and means including two pressure responsive means for influencing the operation of the valve means, each of the said two pressure responsive means being affected by the closed circuit at two spaced locations, one of said responsive means being arranged to limit the frosting of the exit side of the evaporator in the direction of the flow of the refrigerant by its influence on one of said valves, and the other responsive means being arranged to admit of an operating cycle of the refrigerant by its influence on the other of said valve.

12. In a refrigeration system having an evaporator arranged for inclusion in a closed refrigerant circuit, in combination, a valve for controlling the flow of refrigerant to said evaporator, pressure actuated means having opposed pressure means for operating said valve, said actuating means being actuated by the variable resultant pressure of said opposed pressure means, one opposed pressure means being responsive to and variable with the temperature at a portion intermediate the entrance and exit sides of the evaporator, the other of said opposed pressure means being responsive to the pressure of the refrigerant and variable with the load on the evaporator.

13. In a refrigeration system having an evaporator arranged for inclusion in a closed refrigerant circuit, in combination, a valve for controlling the flow of refrigerant to said evaporator, pressure actuated means having opposed pressure means for operating said valve, said actuating means being actuated by the variable resultant pressure of said opposed pressure means, one opposed pressure means being responsive to and variable with the temperature at a portion intermediate the entrance and exit sides of the evaporator, the other of said opposed pressure means being in communication with said evaporator and variable with the load on the evaporator.

14. In combination with an evaporator arranged for inclusion in a closed circuit for a refrigerant, a valve for controlling the flow of refrigerant to said evaporator, pressure actuated means having opposed pressure means for operating said valve, said actuating means being actuated by the variable resultant pressure of said opposed pressure means, one opposed pressure means being responsive to and variable with the temperature at a portion intermediate the entrance and exit sides of the evaporator, the other of said opposed pressure means being in communication with said closed circuit and variable with the load on the evaporator.

15. In combination with a fluid discharge conduit, a refrigerating system including evaporator means for cooling said conduit, said evaporator means being in heat transfer relation with the fluid discharge conduit, a control valve for controlling the delivery of the refrigerant to the evaporator means, and thermally actuated means influenced by the evaporator means for controlling the control valve to admit of an operating cycle of the flow of the refrigerant in the evaporator means to cool the fluid discharge conduit.

16. In combination with a fluid discharge conduit, a refrigerating system for cooling said conduit, comprising, in combination, evaporator means near said fluid discharge conduit, first and second control valves for controlling the flow of the refrigerant through said evaporator means, first means responsive to the temperature of the evaporator means for operating said first control valve to admit of an operating cycle to the flow of said refrigerant, and second means responsive to the temperature of the evaporator means for operating said second control valve to limit frosting on said evaporator means.

17. A refrigeration control device comprising, in combination, a valve casing, a valve mounted in the casing, flexible wall means for sealing the valve in the casing, temperature responsive means disposed externally of the flexible wall means to influence the operation of the valve through the flexible wall means, and means to alter the influence that the temperature responsive means has upon the operation of the valve.

18. A regulating valve unit for an evaporator arranged for inclusion in a closed circuit for a refrigerant comprising, in combination, a valve casing, a valve mounted in the casing, flexible means influenced by refrigerant and enclosing the valve within the casing, automatic means arranged to transmit a motion through the flexible means under the influence of the refrigerant and operate the valve, said automatic means including a flexible wall means and a temperature responsive device filled with a thermo-expansible fluid, said temperature responsive device located externally of a portion intermediate the entrance and the exit side of the evaporator for controlling the valve to admit of an operating cycle to the flow of the refrigerant in the evaporator in accordance with a de-frosting cycle governed by the variation of the temperature at said given location of the temperature responsive device.

19. A regulating valve unit for an evaporator arranged for inclusion in a closed circuit for a refrigerant comprising, in combination, a valve casing, a valve mounted in the casing, flexible means influenced by refrigerant and enclosing the valve within the casing, automatic means arranged to transmit a motion through the flexible means under the influence of the refrigerant and operate the valve, said automatic means including a flexible wall means and a temperature responsive device filled with a thermo-expansible fluid, said temperature responsive device located externally of a portion intermediate the entrance and the exit side of the evaporator for controlling the valve to admit of an operating cycle to the flow of the refrigerant in the evaporator in accordance with a de-frosting cycle governed by the variation of the temperature at said given location of the temperature responsive device, and means for adjusting the automatic means to govern the temperature values at which the valve is opened and closed.

20. A regulating valve unit for an evaporator arranged for inclusion in a closed circuit for a refrigerant comprising, in combination, a valve casing, a valve mounted in the casing, flexible means influenced by refrigerant and enclosing the valve within the casing, automatic means arranged to transmit a motion through the flexible means under the influence of the refrigerant and operate the valve, said automatic means including a flexible wall means and a temperature responsive device filled with a thermo-expansible fluid, said temperature responsive device located externally of a portion intermediate the entrance and the exit side of the evaporator for controlling the valve to admit of an operating cycle to the flow of the refrigerant in the evaporator in accordance with a de-frosting cycle governed by the variation of the temperature at said given location of the temperature responsive device, and equalizing means cooperatively associated with the valve and adapted to off-set the internal pressure of the refrigerant upon the flexible means to make the operation of the valve substantially independent of the internal influence of the refrigerant acting upon the flexible means.

21. A device for controlling the flow of refrigerant in an evaporator having an entrance and an exit side comprising, in combination, a container for holding a liquid, a discharge fluid pipe extending from the container and in heat transfer relation with the evaporator, means for controlling the discharge of the fluid from the fluid pipe, a first valve connected in communication with the evaporator for controlling the flow of refrigerant, means for controlling the first valve to admit of an operating cycle of the flow of the refrigerant through the evaporator in response to the variation of the temperature at a given portion intermediate the entrance and the exit side of the evaporator, a second valve connected in communication with the evaporator for controlling the flow of refrigerant, means for governing the second valve in response to the variation of the temperature at a given portion of the exit side of the evaporator to limit the frosting of the exit side of the evaporator in the direction of the flow of the refrigerant.

22. A device for controlling the flow of refrigerant in an evaporator having an entrance and an exit side comprising, in combination, a first valve means including a snap-action valve connected in communication with the evaporator for quickly controlling the flow of refrigerant, means for controlling the first valve to admit of an operating cycle of the flow of the refrigerant through the evaporator in response to the variation of the temperature at a given portion intermediate the entrance and the exit side of the evaporator, a second valve connected in communication with the evaporator for controlling the flow of refrigerant, means for governing the second valve in response to the variation of the temperature at a given portion of the exit side of the evaporator to limit the frosting of the exit side of the evaporator in the direction of the flow of the refrigerant.

23. The combination with an evaporator arranged for inclusion in a closed circuit for a refrigerant, of valve means including a snap-action valve connected in communication with the evaporator for quickly controlling the flow of refrigerant, and means including two temperature responsive means governed by the variation of temperature at two spaced portions of the closed circuit for governing the valve means, one of said responsive means being arranged to limit the frosting of the exit side of the evaporator in the direction of the flow of the refrigerant and the other said responsive means being arranged to admit of an operating cycle of the flow of the refrigerant in the evaporator.

24. The method of controlling a valve and the flow of refrigerant in a closed circuit of a refrigerating system including an evaporator which comprises quickly opening and quickly closing the valve in accordance with a de-frosting cycle governed by the variation of the temperature at a given portion intermediate the exit and entrance sides of the evaporator.

25. In combination with a fluid discharge conduit, a refrigerating system for cooling said conduit including an evaporator having an entrance and an exit side, said evaporator being in heat transfer relation with the fluid discharge conduit, valve means including a snap-action valve for controlling the delivery of the refrigerant to the evaporator, a first thermally actuated means influenced by the variation in temperature at a given portion intermediate the entrance and the exit side of the evaporator for controlling the snap-action valve, and a second thermally actuated means influenced by the variation in temperature at a given portion of the exit side of the evaporator for controlling the said valve means to admit of an operating cycle of the flow of the refrigerant in the evaporator to cool the fluid discharge conduit.

RUFUS E. STOLZ.